July 24, 1962  H. D. KORONES ET AL  3,045,545

OPTICAL SYSTEM FOR SIGHTING INSTRUMENTS

Filed Nov. 10, 1960

FIG. 1

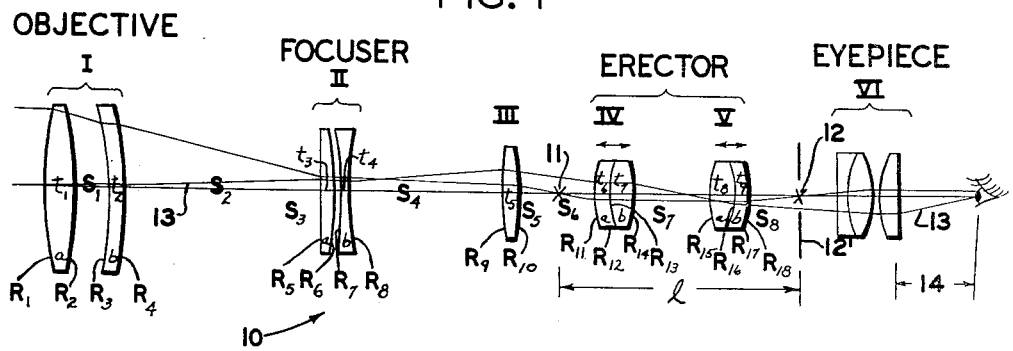

FIG. 2

| LENS GROUP | LENS ELEM. | RADII | THICKNESSES | FOCAL LGTH | SPACINGS | | $n_D$ | $\nu$ |
|---|---|---|---|---|---|---|---|---|
| I | a | $R_1 = 103.75$ | $t_1 = 11.0$ | +240.82 | $S_1 = 16.05$ | | 1.517 | 64.5 |
| | | $R_2 = -149.97$ | | | | | | |
| | b | $R_3 = -107.65$ | $t_2 = 6.0$ | | $S_2 = 156.9$ | | 1.7506 | 27.8 |
| | | $R_4 = -376.70$ | | | $S_3 = 1.57$ | | | |
| II | a | $R_5 = \infty$ | $t_3 = 2.5$ | -67.87 | $S_4 = 53.6$ | | 1.689 | 30.9 |
| | | $R_6 = -50.582$ | | | | | | |
| | b | $R_7 = -45.290$ | $t_4 = 1.5$ | | $S_5 = 12.4$ | | 1.620 | 60.3 |
| | | $R_8 = 40.551$ | | | | | | |
| III | | $R_9 = 29.648$ | $t_5 = 4.5$ | +49.0 | $S_6$ | L = 35.227 | 1.5286 | 51.6 |
| | | $R_{10} = -194.09$ | | | | U = 25.72 | | |
| | | | | | | H = 17.129 | | |
| IV | a | $R_{11} = 31.915$ | $t_6 = 1.6$ | +36.3 | $S_7$ | L = 31.173 | 1.7506 | 27.8 |
| | | $R_{12} = 15.276$ | | | | U = 33.064 | | |
| | b | $R_{13} = 16.444$ | $t_7 = 4.8$ | | | H = 3.852 | 1.612 | 59.5 |
| | | $R_{14} = -36.983$ | | | | | | |
| V | a | $R_{15} = 31.915$ | $t_8 = 4.6$ | +29.7 | $S_8$ | L = 26.98 | 1.612 | 59.5 |
| | | $R_{16} = -13.183$ | | | | U = 34.595 | | |
| | b | $R_{17} = -12.706$ | $t_9 = 3.0$ | | | H = 72.398 | 1.7506 | 27.8 |
| | | $R_{18} = -26.546$ | | | | | | |

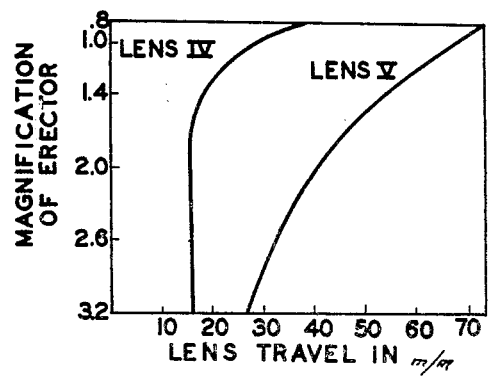

FIG. 3

HERBERT D. KORONES
HAROLD E. ROSENBERGER
INVENTORS

BY Frank C. Parker

ATTORNEY

3,045,545
OPTICAL SYSTEM FOR SIGHTING INSTRUMENTS

Herbert D. Korones, Rochester, and Harold E. Rosenberger, Brighton, N.Y., assignors to Bausch & Lomb Incorporated, Rochester, N.Y., a corporation of New York Filed Nov. 10, 1960, Ser. No. 68,504
4 Claims. (Cl. 88—57)

This invention relates to an optical system for sighting instruments and more particularly relates to improvements in zoom type of variable power optical systems therefor.

It is an object of this invention to provide a novel and improved zoom type of variable power optical system for sighting instruments and kindred devices wherein the image which is formed by the movable zoom lenses remains focused at a substantially stationary image position for all magnification thereof whereby the eyepiece of the instrument need not be moved coincident with changes of magnification of the instrument to maintain a correct focus thereof.

A further object of this invention is to provide such a device wherein the continuous variation of the power of a telescope is effected by two continuously and differentially moved image erecting lens members, the focal lengths or individual powers of said members being so chosen as to provide a large range of magnification of the image while achieving an excellent state of correction of all principal image aberrations, and good flatness of field.

It is a further object to provide such a device by simple and low-cost forms of optical construction but which is nevertheless reliable and is capable of high grade optical performance.

Further objects and advantages will be found in the details of construction and the combination and arrangement of parts by reference to the specification herebelow taken together with the accompanying drawing in which:

FIG. 1 is an optical diagram of a variable power telescope constructed according to our invention;

FIG. 2 is a table of constructional data related to a preferred form of our invention shown in FIG. 1; and FIG. 3 is a graph which illustrates the differential motion of the movable zoom erector lens members.

A preferred form of our invention is incorporated in a zoom type of variable power telescope 10 shown in FIG. 1 of the drawing. By "zoom type" is meant a variable power optical system which magnifies an image by continuous and uninterrupted changes of power throughout its range of magnifications of said image. Said telescope 10 comprises an objective I, a focusing lens II, a field lens member III, a pair of "zoom" or power changing erector lens members IV and V, and an eyepiece VI. All of these optical members are aligned on a common optical axis and all except member III are constructed in compound form, the elements thereof being so constructed and arranged that all of the principal image aberrations such as chromatic and spherical aberrations, coma and astigmatism as well as flatness of field are reduced to very small amounts so as to achieve a high grade of performance from the instrument throughout the range of action of the "zoom" lenses.

By adhering to the best procedure for devising such an optical system, the detailed design of the aforesaid optical members begins with the zoom lens or erector lens section IV and V, these lenses being spaced between a fixed image point 11 and a fixed rearwardly spaced image plane 12 marked by a diaphragm 12'.

Of primary importance in this invention as well as in any zoom type of variable power optical system is the selection of focal lengths and spacings of the individual movable erector lenses IV and V which accomplish the zooming of the image without causing appreciable axial migration thereof. Optical properties of the lens system such as the range of magnification or zoom range, flatness of the image and correction of the aforesaid image aberrations are greatly benefited by a well determined distribution of lens power in the individual zoom lenses IV and V.

According to this invention by calculation and experiment the present inventors have discovered that for a range of magnification of substantially 4:1 the focal length $F_V$ of the rear erector lens V should be $.80F_{IV}$ to $.84F_{IV}$ where $F_{IV}$ is the focal length of the front erector lens IV. Furthermore, the space $l$ between said image point 11 and the image plane 12 should be chosen from $2.90F_{IV}$ to $3.00F_{IV}$.

Relative differential non-linear motions are provided for the erector lenses IV and V which are so designed as shown diagrammatically in FIG. 3 that the image formed by said lenses remains substantially stationary at the fixed rear image plane 12 during all changes of power or focal length of the combined erector lenses IV and V and suitable actuating mechanism (not shown) is provided for effecting said motions. Each of the erector lenses IV and V is achromatized per se for visible light.

Lens IV is composed of a negative element $IV_a$ and a positive element $IV_b$ and, similarly, lens V is composed of a positive element $V_a$ and a negative element $V_b$. The focal length of the positive elements $IV_b$ and $V_a$ should preferably be from .5 to .6 the focal length of their respective lens members IV and V while the negative focal length of the corresponding negative elements should be numerically between 1.10 and 1.30 of the focal length of their respective lens members IV and V. With the focal lengths $F_{IV}$ and $F_V$ and the distance $l$ constructed as above specified, the air spaces preceding and following lenses IV and V should be as specified herebelow when these two lenses are jointly producing unity magnification of the image:

$$S_6 = .64F_{IV} \text{ to } .78F_{IV}$$
$$S_7 = .82F_{IV} \text{ to } 1.00F_{IV}$$
$$S_8 = .85F_{IV} \text{ to } 1.05F_{IV}$$

wherein $S_6$ is the distance from the image point 11 to erector lens IV, $S_7$ is the axial distance between lenses IV and V, and $S_8$ is the distance between erector lens V and the image plane 12.

A further advantageous feature of this invention results from the fact that the present inventors have discovered that control of the principal ray in entering the zoom lens system IV and V can produce improvement in eye relief whereby the eyepoint remains substantially fixed in position throughout the zoom range and provide a constant apparent field. In effect, the principal ray is caused to traverse the eyepiece IV along substantially the same path for all magnifications of the zoom system. To accomplish this result, control of the principal ray is achieved by suitable design of the lens members I, II, and III and said ray is thereby introduced into the zoom lens system in such a manner that the desired control is achieved.

In accordance with the foregoing paragraph, said objective lens member I comprises a front biconvex element $I_a$ and a meniscus element $I_b$ spaced rearwardly therefrom at a distance $S_1$, the focal length $F_1$ of this combination being from $6.0F_{IV}$ to $7.2F_{IV}$. Preferably, the positive focal length of biconvex element $I_a = 3.0F_{IV}$ to $3.5F_{IV}$ and the negative focal length of meniscus element $I_b = -5.0F_{IV}$ to $-6.0F_{IV}$, while the space $S_1$ therebetween should be between $.43F_{IV}$ and $.47F_{IV}$.

Spaced rearwardly from objective I at a distance within the range $S_2=3.9F_{IV}$ to $4.76F_{IV}$ is a two-part focusing lens member II which is provided to effect internal focusing of the instrument 10 for close object distances. Said focusing member II has a negative focal length $F_{II}$ which is preferably $-1.6F_{IV}$ to $-2.0F_{IV}$. It comprises a front plano convex lens element $II_a$ having a positive focal length of substantially $1.08F_{II}$ and a negative lens element $II_b$ having a negative focal length of substantially $.50F_{II}$, said negative element being spaced rearwardly from lens $II_a$ by a dimension of substantially $.023F_{II}$.

A field lens III is provided rearwardly of the objective I and focusing lens II, said lens III in cooperation with the aforesaid lenses forming a real image at a first image point 11. The focal length of the field lens III lies between $1.2F_{IV}$ and $1.5F_{IV}$ and it is spaced a distance of from $5.8F_{IV}$ to $6.1F_{IV}$ rearwardly of said objective I. Image plane 11 is spaced rearwardly from the field lens III a distance $S_5$ of substantially $.34F_{IV}$.

An eyepiece VI having a long eye relief 14 as well as other suitable optical properties which are compatible with the remaining component parts of the telescope is focused at image plane 12 for viewing the image formed thereat.

Herebelow are given the constructional data related to one successful form of our invention and this material is also given in FIG. 2 of the drawing.

Attention is called to the fact that in the present optical system 10 the principal ray 13 (FIG. 1) is so controlled that it traverses the eyepiece along approximately the same path for all powers of the instrument and this advantageous feature affords stabilization of image aberrations and maintains a substantially constant eye distance 14 and additionally provides a constant apparent field of view. Furthermore, there is here provided an advantageous distribution of powers in the zooming erector lenses so that a very liberal continuous range of image magnifications is afforded while still achieving an excellent state of correction of the image aberrations, all of which is in fulfillment of the objects of this invention.

Although only a preferred form of this invention has been shown and described in detail, other forms are possible and changes may be made in the constructional details thereof within the stated range of values, without departing from the spirit of this invention as defined in the appended claims.

What is claimed is:

1. A zoom type of pancratic optical system for sighting instruments and the like comprising an objective member, a focusing member, a field lens, a pair of movable erector lenses for varying the magnification of the image through a range of substantially 4:1 and an eyepiece for viewing the image formed by said erector lenses, all of these lens parts being optically aligned in the order named, said erector lenses being movable differentially with reference to a stationary image formed cooperatively by the objective member, focusing member and said field lens, said erector lenses being located between said image and

*Table*

| Lens Group | Lens Elem. | Radii | Thicknesses | Focal Lgth. | Spacings | $n_D$ | $\nu$ |
|---|---|---|---|---|---|---|---|
| I | a | $R_1 = 103.75$ | $t_1=11.0$ | | | 1.517 | 64.5 |
| | | $R_2 = -149.97$ | | | $S_1=16.05$ | | |
| | | | | $F_I$ +240.82 | | | |
| | b | $R_3 = -107.65$ | $t_2=6.0$ | | | 1.7506 | 27.8 |
| | | $R_4 = -376.70$ | | | $S_2=156.9$ | | |
| II | a | $R_5 = \infty$ | $t_3=2.5$ | | | 1.689 | 30.9 |
| | | $R_6 = -50.582$ | | | $S_3=1.57$ | | |
| | | | | $F_{II}$ -67.87 | | | |
| | b | $R_7 = -45.290$ | $t_4=1.5$ | | | 1.620 | 60.3 |
| | | $R_8 = 40.551$ | | | $S_4=53.6$ | | |
| III | | $R_9 = 29.648$ | $t_5=4.5$ | | | 1.5286 | 51.6 |
| | | $R_{10}=-194.09$ | | | $S_5=12.4$ | | |
| | | | | | $S_6\begin{cases}L=35.227\\U=25.72\\H=17.129\end{cases}$ | | |
| | | $R_{11}= 31.915$ | | $F_{III}$ +49.0 | | | |
| IV | a | | $t_6=1.6$ | | | 1.7506 | 27.8 |
| | | $R_{12}= 15.276$ | | | | | |
| | b | $R_{13}= 16.444$ | $t_7=4.8$ | | | 1.612 | 59.5 |
| | | | | $F_{IV}$ +36.3 | | | |
| | | $R_{14}=-36.983$ | | | $S_7\begin{cases}L=31.173\\U=33.064\\H=3.852\end{cases}$ | | |
| V | a | $R_{15}= 31.915$ | $t_8=4.6$ | | | 1.612 | 59.5 |
| | | $R_{16}=-13.183$ | | $F_V$ +29.7 | | | |
| | b | $R_{17}=-12.706$ | $t_9=3.0$ | | | 1.7506 | 27.8 |
| | | $R_{18}=-26.546$ | | | $S_8\begin{cases}L=26.98\\U=34.595\\H=72.398\end{cases}$ | | | wherein:
L signifies lowest magnification
U signifies unity magnification
H signifies high magnification a second substantially stationary image plane formed rearwardly of and by the aforesaid erector lenses, the focal length $F_V$ of the rearmost erector lens being 80% to 84% of the focal length $F_{IV}$ of the front erector lens and the axial distance between said image and said second image plane being between $2.9F_{IV}$ and $3.0F_{IV}$, whereby a magnification range of substantially 4:1 is provided for the instrument, the principal ray being so controlled by the lens members ahead of the erector lenses and by the erector lenses that said ray traverses said eyepiece along substantially the same path during all changes of magnification, the control function being effected by a calculated combination of focal lengths and spacings of objective I, focusing lens II, field lens III and erector lenses IV and V, as follows:

$$6.0F_{IV} < F_I < 7.2F_{IV}$$
$$1.6F_{IV} < -F_{II} < 2.0F_{IV}$$
$$1.2F_{IV} < F_{III} < 1.5F_{IV}$$
$$3.90F_{IV} < S_2 < 4.76F_{IV}$$
$$1.33F_{IV} < S_4 < 1.61F_{IV}$$
$$.31F_{IV} < S_5 < .38F_{IV}$$

wherein, $F_I$ is the focal length of the objective lens
$F_{II}$ is the focal length of the focusing lens
$F_{III}$ is the focal length of the field lens
$S_2$ is the axial space between lens I and lens II
$S_4$ is the axial space between lens II and lens III
$S_5$ is the axial space between lens III and the first focal plane following lens III.

2. An optical system for telescopes according to claim 1 wherein said erector lenses are individually achromatically corrected and each comprises a positive element and a negative element with the positive elements nearest to each other, the focal length of said positive elements being between .5 and .6 of the focal length of their respective lens members and the negative focal length of said negative elements being between 1.10 and 1.30 of the focal lengths of their respective lens members.

3. A zoom type of pancratic optical system for sighting instruments comprising an objective member, a movable focusing member located coaxially rearwardly thereof, and a stationary field lens located rearwardly of said focusing member, the aforesaid lenses cooperating to form an image of an object at a first image plane, a pair of erecting lenses which are movable differentially to change the magnification of the image formed rearwardly thereof by said lenses at a second image plane, and an eyepiece focused at said second image plane, the constructional data being given in the table of values herebelow wherein $R_1$ to $R_{18}$ are the radii of the lens elements successively from the front of the system, $t_1$ to $t_9$ are the axial thicknesses of said elements, $S_1$ to $S_8$ are the axial distances between the lens members, $F_I$ to $F_V$ are the focal lengths of said members, $n_D$ represents the refractive index for the D line of the spectrum of the optical construction materials and $\nu$ represents the Abbe numbers therefor:

*Table*

| Lens Group | Lens Elem. | Radii | Thicknesses | Focal Length | Spacings | $n_D$ | $\nu$ |
|---|---|---|---|---|---|---|---|
| I | a | $R_1 = 103.75$ $R_2 = -149.97$ | $t_1 = 11.0$ | $F_I$ +240.82 | $S_1 = 16.05$ | 1.517 | 64.5 |
| | b | $R_3 = -107.65$ $R_4 = -376.70$ | $t_2 = 6.0$ | | $S_2 = 156.9$ | 1.7506 | 27.8 |
| II | a | $R_5 = \infty$ $R_6 = -50.582$ | $t_3 = 2.5$ | $F_{II}$ −67.87 | $S_3 = 1.57$ | 1.689 | 30.9 |
| | b | $R_7 = -45.290$ $R_8 = 40.551$ | $t_4 = 1.5$ | | $S_4 = 53.6$ | 1.620 | 60.3 |
| III | | $R_9 = 29.648$ $R_{10} = -194.09$ | $t_5 = 4.5$ | $F_{III}$ +49.0 | $S_5 = 12.4$ $S_6 \begin{cases} L = 35.227 \\ U = 25.72 \\ H = 17.129 \end{cases}$ | 1.5286 | 51.6 |
| IV | a | $R_{11} = 31.915$ $R_{12} = 15.276$ | $t_6 = 1.6$ | | | 1.7506 | 27.8 |
| | b | $R_{13} = 16.444$ $R_{14} = -36.983$ | $t_7 = 4.8$ | $F_{IV}$ +36.3 | $S_7 \begin{cases} L = 31.173 \\ U = 33.064 \\ H = 3.852 \end{cases}$ | 1.612 | 59.5 |
| V | a | $R_{15} = 31.915$ $R_{16} = -13.183$ | $t_8 = 4.6$ | $F_V$ +29.7 | | 1.612 | 59.5 |
| | b | $R_{17} = -12.706$ $R_{18} = -26.546$ | $t_9 = 3.0$ | | $S_8 \begin{cases} L = 26.98 \\ U = 34.595 \\ H = 72.393 \end{cases}$ | 1.7506 | 27.8 | wherein:
L signifies lowest magnification
U signifies unity magnification
H signifies high magnification 4. A zoom type of erector for a variable power optical system for sighting instruments comprising a pair of erector lenses mounted coaxially with said system and individually movable axially differentially in such a manner as to form a substantially stationary well corrected rear image of a stationary front image at a constantly variable magnification through a magnification range of substantially 4, said front and rear images being separated by a distance which is designated by $l$, the focal lengths $F_{IV}$ and $F_V$ of the front and rear lenses respectively being positive and being related to each other by the mathematical statement, $$.80F_{IV} < F_V < .84F_{IV}$$

the distance $l$ being given by the statement $$2.9F_{IV} < l < 3.0F_{IV}$$

the variable distances $S_6$ between said front image and said front lens, $S_7$ between the two lenses, and $S_8$ between the rear lens and said rear image being given by the mathematical statements herebelow when said lenses are in a position to produce unity magnification $$.64F_{IV} < S_6 < .78F_{IV}$$
$$.82F_{IV} < S_7 < 1.0F_{IV}$$
$$.85F_{IV} < S_8 < 1.05F_{IV}$$

each erector lens having a positive and a negative lens element, the refractive index thereof being respectively substantially 1.612 and 1.7506.

References Cited in the file of this patent
UNITED STATES PATENTS

| | | |
|---|---|---|
| 1,091,933 | Humbrecht | Mar. 31, 1914 |
| 2,479,792 | Tackaberry | Aug. 29, 1949 |
| 2,662,443 | Loeck | Dec. 15, 1953 |